United States Patent [19]

Nishikawa

[11] Patent Number: 5,557,601
[45] Date of Patent: Sep. 17, 1996

[54] OPTICAL INFORMATION RECORDING/REPRODUCING METHOD AND APPARATUS IN WHICH A FIRST OPTICAL SPOT PERFORMS FOCUSING, TRACKING, ERASING AND RECORDING AND A SECOND OPTICAL SPOT PERFORMS TWO REPRODUCING MODES

[75] Inventor: Koichiro Nishikawa, Takasaki, Japan

[73] Assignee: Canon Kabushiki Kaisha, Tokyo, Japan

[21] Appl. No.: 228,398

[22] Filed: Apr. 15, 1994

[30] Foreign Application Priority Data

Apr. 22, 1993 [JP] Japan .................................. 5-117660

[51] Int. Cl.⁶ .................................................. G11B 7/00
[52] U.S. Cl. .................. 369/121; 369/112; 369/44.37; 369/44.38; 369/44.41
[58] Field of Search ........................ 369/100, 13, 44.37, 369/44.38, 59, 44, 41, 110, 112, 116, 122, 121

[56] References Cited

U.S. PATENT DOCUMENTS

| | | | |
|---|---|---|---|
| 4,517,667 | 5/1985 | Sprague | 369/122 |
| 4,841,514 | 6/1989 | Tsuboi et al. | 369/100 |
| 4,853,912 | 8/1989 | Akasaka et al. | 369/13 |
| 4,980,879 | 12/1990 | Yamada et al. | 369/116 |
| 5,018,127 | 5/1991 | Ando | 369/112 |
| 5,043,960 | 8/1991 | Nakao et al. | 369/13 |
| 5,365,535 | 11/1994 | Yamaguchi et al. | 369/121 |
| 5,367,512 | 11/1994 | Satou et al. | 369/44.38 |
| 5,463,610 | 10/1995 | Nishikawa | 369/121 |

FOREIGN PATENT DOCUMENTS 58-220247  12/1983  Japan.
64-82348   3/1989   Japan.

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical information recording and/or reproducing apparatus includes an optical system for letting first and second optical beams pass through substantially the same optical path to form first and second optical spots on the same information track on a surface of an information recording medium and for guiding reflected light from the surface of the information recording medium to photo sensors to detect recorded information in the information recording medium. The first optical spot is used for focusing error detection, tracking error detection, erasing of old information, and recording of new information. The second optical spot is used both for reproduction-while-recording of newly recorded information and for normal reproduction of recorded information. The first optical spot advances and the second optical spot follows on a moving information track.

12 Claims, 4 Drawing Sheets

PREAMPLIFIER 1∼10

OPTICAL INFORMATION RECORDING/REPRODUCING METHOD AND APPARATUS IN WHICH A FIRST OPTICAL SPOT PERFORMS FOCUSING, TRACKING, ERASING AND RECORDING AND A SECOND OPTICAL SPOT PERFORMS TWO REPRODUCING MODES

BACKGROUND OF THE INVENTION

1. Field of the Invention

The present invention relates to an optical information recording and/or reproducing apparatus such as a magneto-optical disc apparatus. More particularly, the invention relates to an optical information recording and/or reproducing apparatus which can perform simultaneous recording/reproducing or simultaneous erasing/recording/reproducing while forming two optical spots on a recording medium.

2. Related Background Art

The magneto-optical disc apparatus is known as a data file device, utilizing the features of mass storage, and non-contact and rapid access. If such an apparatus employs an optical head irradiating a single optical beam, data recording normally requires rotation of a magneto-optical disc for each of erasing old information, recording new information, and checking (or verifying) the newly recorded information, i.e., three rotations in total. Alternatively, the erasing of old information and the recording of new information can be done at one time during one rotation and verifying of reproduction during a next rotation. Thus, the conventional magneto-optical disc apparatus requires a waiting time for rotations of the magneto-optical disc, which is a hindrance against an improvement in data transfer rate.

There are optical information recording and/or reproducing apparatus which can perform simultaneous erasing/recording/reproducing or simultaneous recording/reproducing using an optical head irradiating a plurality of optical beams, for example, as suggested in Japanese Laid-open Patent Application No. 58-220247 (corresponding to U.S. Pat. No. 4,517,667) or in Japanese Laid-open Patent Application No. 64-82348. FIG. 1 is a schematic diagram to show an example of such a conventional magneto-optical recording and/or reproducing apparatus using an optical head for irradiating a plurality of beams.

In FIG. 1, a monolithic semiconductor laser array 1 has a first radiative point 1a and a second radiative point 1b on the same substrate, and beams of linearly polarized light emitted from the radiative points pass through nearly the same optical path to be focused on a magneto-optical disc 5. In more detail, the optical beams emitted from the laser array 1 are collimated by a collimating lens 2 and the collimated beams pass through a beam splitter 3 with a beam shaping portion and are then focused by an objective lens 4 to form two optical spots 13a, 13b on an information recording surface 6 in the magneto-optical disc 5. The radiative point 1a corresponds to the optical spot 13a and the radiative point 1b to the optical spot 13b. The two optical spots 13a, 13b are arranged such that the optical spot 13a advances and the optical spot 13b follows on the same information track in the information recording surface 6 in the magneto-optical disc 5 rotating in the direction of arrow 17. Beams of light reflected by the information recording surface 6 are again condensed by the objective lens 4 and then deflected by the beam splitter 3 with the beam shaping portion to be guided into a signal detecting optical system.

The signal detecting optical system is composed of a half wave plate 7, a condenser lens 8, a polarization beam splitter 9, and photo sensors 11, 12 each having a split light receiving region. The half wave plate 7 and the polarization beam splitter 9 function to equalize a quantity of light reaching the photo sensor 11 nearly with that reaching the photo sensor 12. The photo sensor 11 has receiving zones a1, b1, c1, d1, e1 while the photo sensor 12 has receiving zones a2, b2, c2, d2, e2. Optical spots 14a, 14b are formed on the photo sensor 11, corresponding to the optical spots 13a, 13b on the information recording surface 6 (i.e., corresponding to the radiative points 1a, 1b). Also, optical spots 15a, 15b are formed on the photo sensor 12, corresponding to the optical spots 13a, 13b on the information recording surface 6 (i.e., corresponding to the radiative points 1a, 1b).

In data recording, the radiative point 1a emits a beam to form the optical spot 13a with a recording power, and the radiative point 1b emits a beam to form the optical spot 13b with a reproduction power lower than the recording power. Further, an external magnetic field head 16 applies a magnetic field modulated by data information to a recording area. Then, obtained from the optical spot 13b for reproduction are servo signal information for so-called focusing and tracking, and an information reproduction signal for verifying information recorded by the optical spot 13a. This arrangement permits simultaneous achievement of erasing of old information, recording of new information, and reproduction for verifying the newly recorded information.

For normal data reproduction, only the radiative point 1b is activated to emit a beam to form the optical spot 13b with reproduction power.

Describing outputs from the receiving zones in the photo sensors by the same reference symbols as those for the receiving zones, various signals can be obtained by the following calculations:

$$\text{focusing signal} = (a1 + d1) - (a2 + d2);$$
$$\text{tracking signal} = (b1 - c1) - (b2 - c2);$$

verify-reproduction-while-recording magneto-optical $$(MO) \text{ signal} = (a1 + b1 + c1 + d1) - (a2 + b2 + c2 + d2);$$

normal reproduction $MO$ signal =

$$(a1 + b1 + c1 + d1) - (a2 + b2 + c2 + d2);$$

and
preformat signal =

$$(a1 + b1 + c1 + d1) + (a2 + b2 + c2 + d2).$$

Outputs from the receiving zones e1, e2 where the optical spots 14a, 15a are formed are normally unused.

FIG. 2 is a schematic diagram to show a modification of the signal detecting optical system in the conventional MO recording and/or reproducing apparatus using the optical head emitting a plurality of beams, as described above. This modification is different in the arrangement of receiving zones in the photo sensors 11, 12 from the arrangement in FIG. 1.

This modification is so arranged that in data recording, the radiative point 1a emits a beam to form the optical spot 13a with a recording power and the radiative point 1b emits a beam to form the optical spot 13b with a reproduction power lower than the recording power, and that an external magnetic field head (not shown) applies a magnetic field modulated by data information to a recording area. In this arrangement, servo signal information for so-called focusing and tracking is obtained from the optical spot 13a, while an information reproduction signal for verification of information recorded by the optical spot 13a is obtained from the optical spot 13b. This permits simultaneous achievement of erasing of old information, recording of new information, and reproduction for verifying the newly recorded information.

For normal data reproduction, only the radiative point 1a is activated to emit a beam to form the optical spot 13a with reproduction power.

Describing outputs from the receiving zones in the photo sensors by the same reference symbols as those for the receiving zones, various signals can be obtained by the following calculations:

focusing signal = $(a1 + d1) - (a2 + d2)$;
tracking signal = $(b1 - c1) - (b2 - c2)$;
verify-reproduction-while-recording MO signal = $e1 - e2$;
normal reproduction MO signal =

$$(a1 + b1 + c1 + d1) - (a2 + b2 + c2 + d2);$$

and
preformat signal =

$$(a1 + b1 + c1 + d1) + (a2 + b2 + c2 + d2).$$

Incidentally, the optical system as shown in FIG. 1 is generally arranged to assure a recording power of 6 to 10 mW with such characteristics of a beam split film in the beam splitter 3 with a beam shaping portion that the transmittance is in the range of about 60 to 80% and the reflectivity in the range of about 20 to 40%. Accordingly, the reproduction power is about 1.2 mW, and, assuming the reflectivity of the magneto-optical disc is about 15% and attenuation by interposed optical elements is about 20%, a quantity of light reaching each photo sensor 11, 12 is as weak as about 0.02 mW. Also, an MO signal is further weaker, which is about 5% of the quantity of light reaching each sensor. A signal from each receiving zone in the photo sensor 11, 12 is amplified by a pre-amplifier (preamp) and transmitted to a signal processing system, as shown in the block diagram of FIG. 3. Therefore, the noise characteristics of the preamps as shown in FIG. 3 greatly affect the performance of reproducing the MO signal.

Nevertheless, the above conventional example as shown in FIG. 2 obtained the MO signals as follows:

verify-reproduction-while-recording MO signal = $e1 - e2$;
and
normal reproduction MO signal =

$$(a1 + b1 + c1 + d1) - (a2 + b2 + c2 + d2).$$

Taking the photo sensor 11 as an example, a preamp is used for verify-reproduction-while-recording whereas four preamps for normal reproduction. Then, letting $\alpha$ [Ap-p] be a noise level for each preamp, noise caused by the preamps is $\alpha$ [Ap-p] in verify-reproduction-while-recording but $2\alpha$ [Ap-p] by mean square in normal reproduction. Thus, the normal reproduction has a worse S/N ratio (Signal to Noise Ratio) than the verify-reproduction-while-recording has, which makes the verification less meaningful. Also, the noise caused by the preamps is proportional to a square root of the frequency band of the signal. On the other hand, the frequency band of the signal must be widened to improve the data transfer rate, which increases the noise caused by the preamps. An absolute value of S/N will be insufficient in a case of a plurality of preamps involved.

An increase in noise caused by the preamps can be prevented by a separate arrangement of a servo signal detecting optical system and a data information signal detecting optical system, though not shown. In this case, a quantity of light reaching the data information signal detecting system sensor is decreased by a quantity separated into the servo signal detecting system, which lowers S/N, increases the size of the apparatus, increases the cost, and makes assembling and adjustment complex.

SUMMARY OF THE INVENTION

It is, therefore, an object of the present invention in view of the above problem in the conventional technology to provide an optical information recording and/or reproducing apparatus which can transfer data at a high rate, which can perform simultaneous erasing/recording/reproducing, and which is excellent in S/N, cheap in cost and compact in size.

The present invention provides an optical information recording and/or reproducing apparatus, achieving the above object, which comprises means for letting first and second optical beams pass through substantially the same optical path to form first and second optical spots on the same information track on a surface of an information recording medium, and means for guiding reflected light from said surface of the information recording medium to photo sensors to detect recorded information in said information recording medium, wherein said first optical spot is used for focusing error detection, tracking error detection, erasing of old information, and recording of new information, while said second optical spot is used both for reproduction-while-recording of newly recorded information and for normal reproduction of recorded information and wherein the first optical spot advances and the second optical spot follows on a moving information track.

In the present invention, a plurality of receiving zones may constitute a light receiving portion in each photo sensor, optically corresponding to the first optical spot, while a receiving zone may constitute a light receiving portion in each photo sensor, optically corresponding to the second optical spot.

Also, the first optical spot may be used for reproduction of a preformat signal in the information recording medium in the present invention.

DETAILED DESCRIPTION OF THE PREFERRED EMBODIMENTS

Specific embodiments of the present invention will be described with reference to the accompanying drawings.

Figure 1:
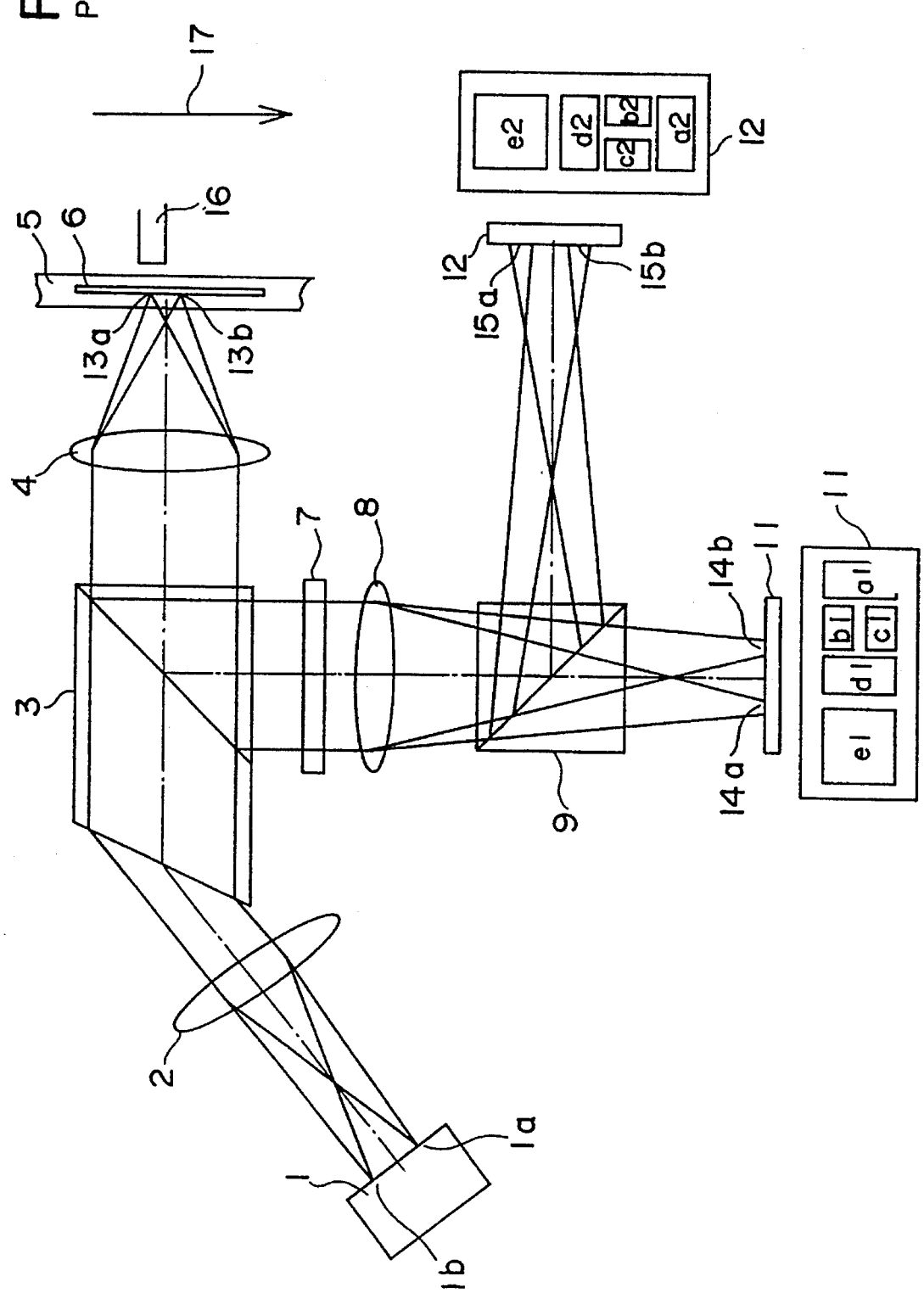
FIG. 1 is a schematic diagram to show an example of a conventional magneto-optical disc apparatus using a multi-beam optical head.
Figure 2:
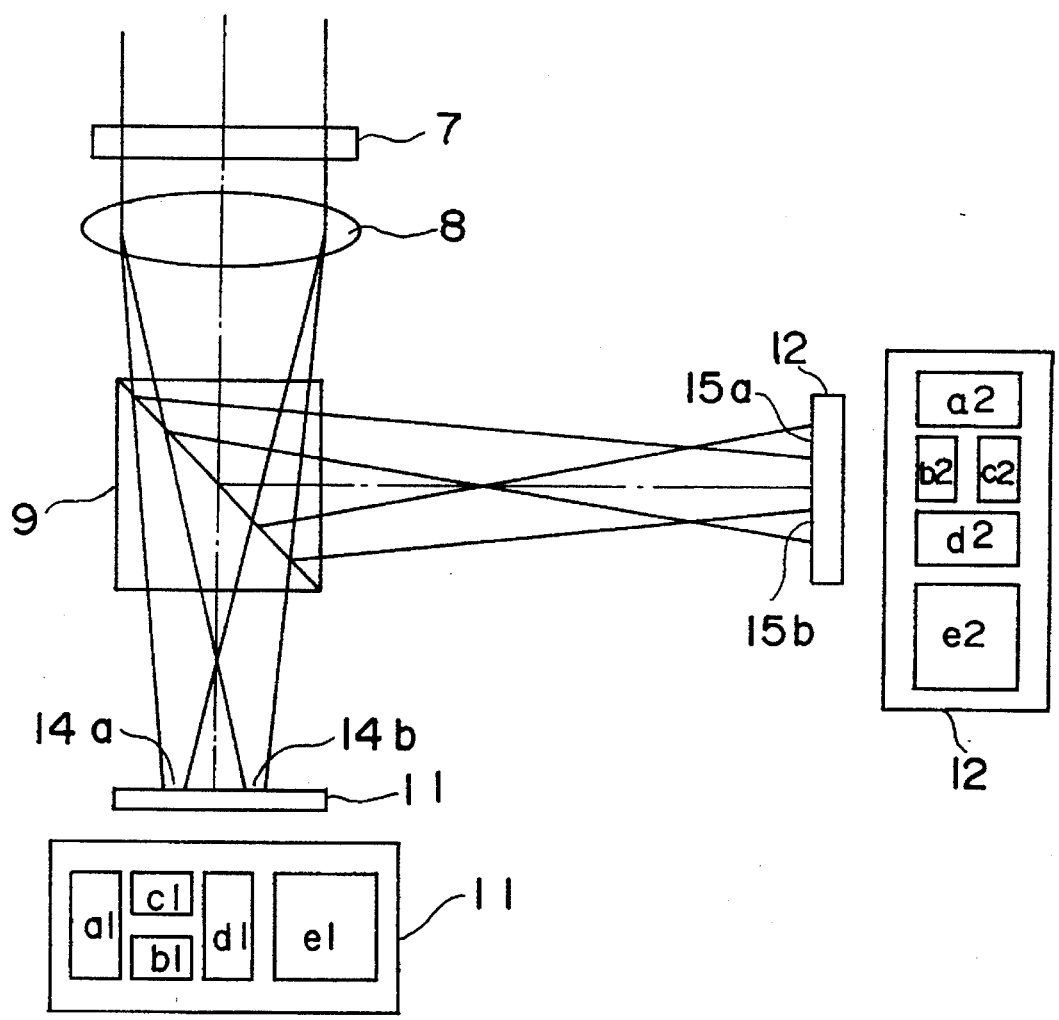
FIG. 2 is a schematic diagram to show a modification of a signal detecting optical system in the magneto-optical disc apparatus of FIG. 1.
Figure 3:
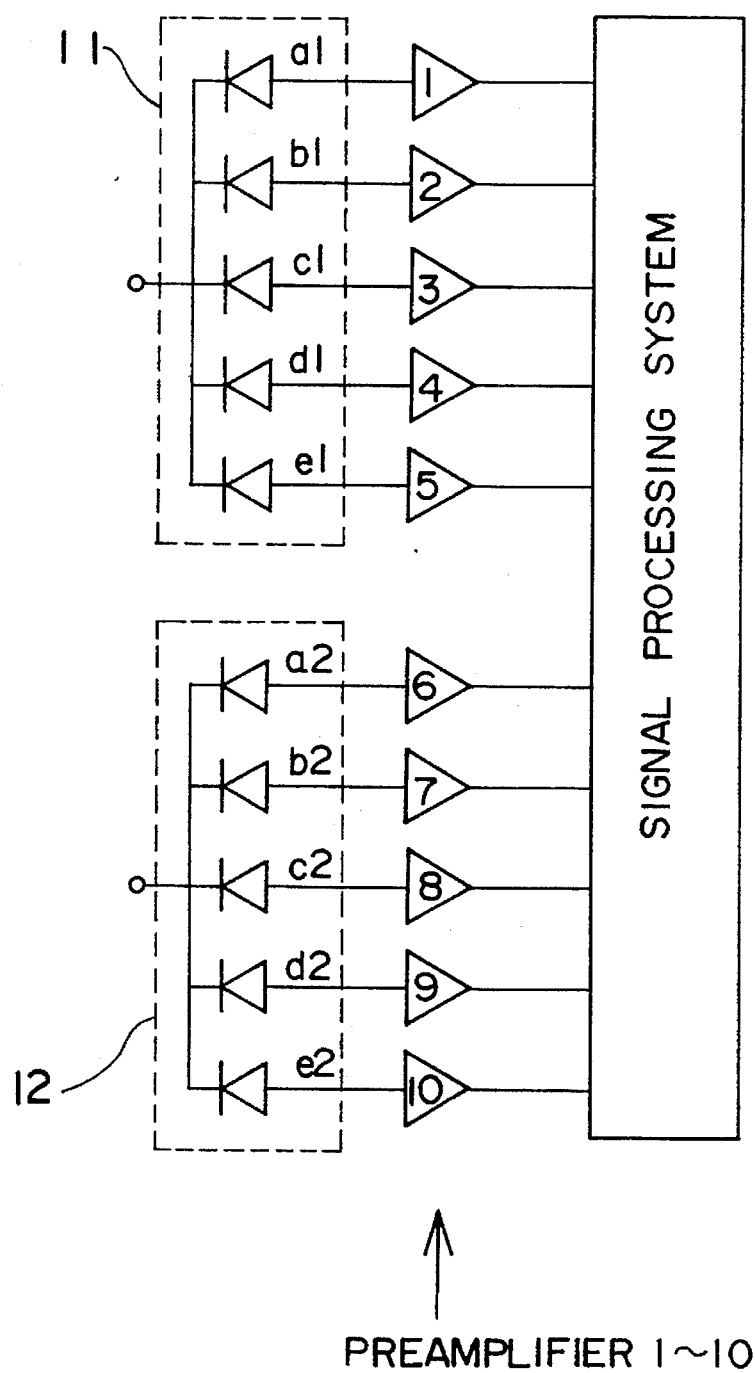
FIG. 3 is a block diagram to show a preamp portion in the signal detecting optical system in the magneto-optical disc apparatus.
Figure 4:
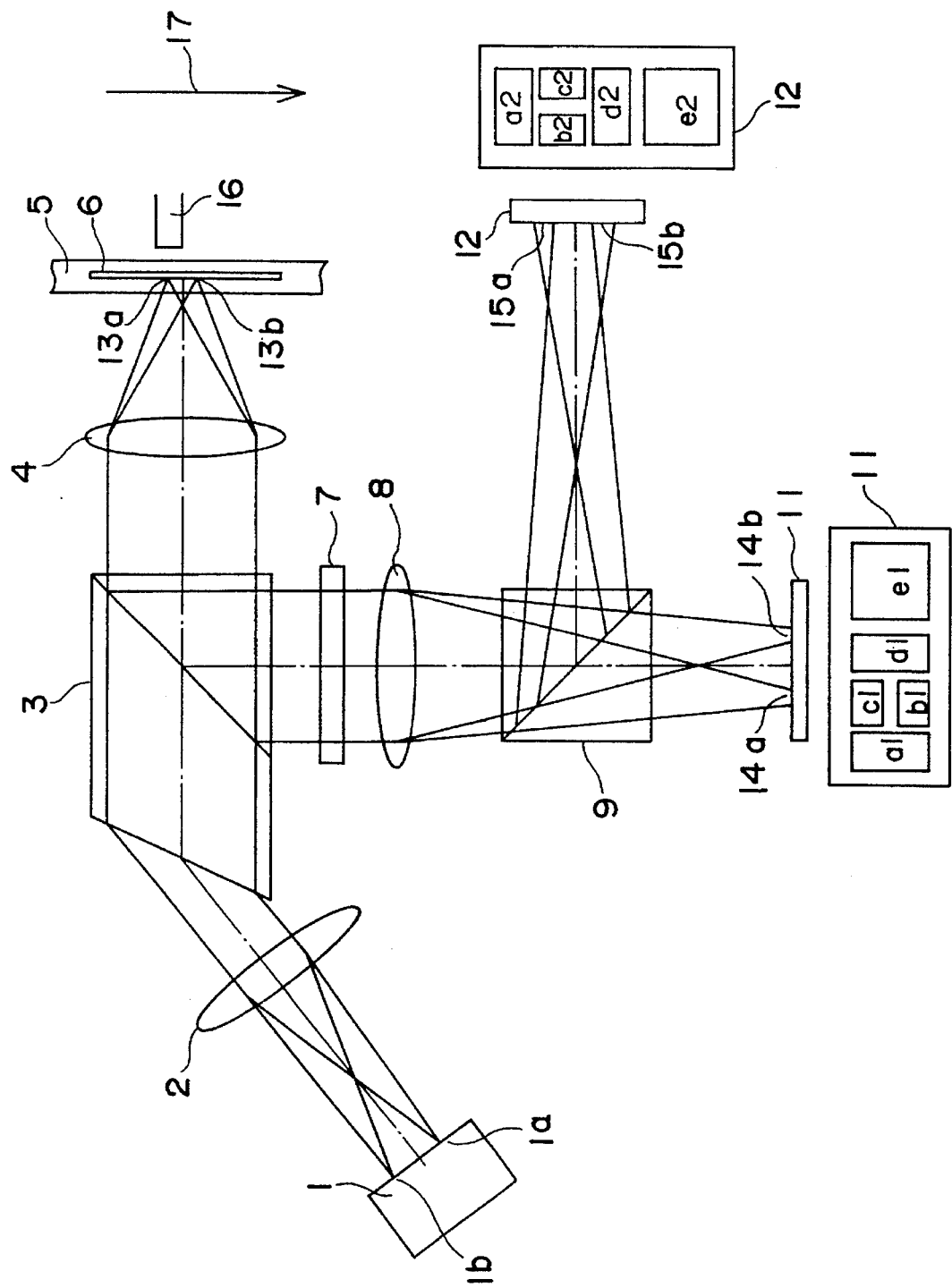
FIG. 4 is a schematic diagram to show an example of a magneto-optical disc apparatus according to the present invention.

FIG. 4 is a schematic diagram to show an example of a magneto-optical disc apparatus as an optical information recording and/or reproducing apparatus according to the present invention.

In FIG. 4, a monolithic semiconductor laser array 1 has a first radiative point 1a and a second radiative point 1b on the same substrate, and beams of nearly linearly polarized light (assumed to be p-polarized light) emitted from the radiative points are guided through substantially the same optical path to be focused on a magneto-optical disc 5 as a magneto-optical recording medium. In more detail, optical beams emitted from the laser array 1 are collimated by a collimating lens 2 and the collimated beams pass through a beam splitter 3 with a beam shaping portion and then focused by an objective lens 4 to form two optical spots 13a, 13b on an information recording surface 6 in the magneto-optical disc 5. The radiative point 1a corresponds to the optical spot 13a while the radiative point 1b to the optical spot 13b. The two optical spots 13a, 13b are arranged such that the optical spot 13a advances and the optical spot 13b follows on the same information track in the information recording surface 6 in the magneto-optical disc 5 rotating in the direction of arrow 17. Beams of light reflected by the information recording surface 6 are again condensed by the objective lens 4 and then deflected by the beam splitter 3 with a beam shaping portion to be guided into a signal detecting optical system.

The signal detecting optical system is composed of a half wave plate 7, a condenser lens 8, a polarization beam splitter 9, and photo sensors 11, 12 each having a split light receiving region. The half wave plate 7 and the polarization beam splitter 9 function to equalize a quantity of light reaching the photo sensor 11 nearly with that reaching the photo sensor 12. The photo sensor 11 has receiving zones a1, b1, c1, d1, e1 while the photo sensor 12 has receiving zones a2, b2, c2, d2, e2. Optical spots 14a, 14b are formed on the photo sensor 11, corresponding to the optical spots 13a, 13b on the information recording surface 6 (i.e., corresponding to the radiative points 1a, 1b). Also, optical spots 15a, 15b are formed on the photo sensor 12, corresponding to the optical spots 13a, 13b on the information recording surface 6 (i.e., corresponding to the radiative points 1a, 1b ).

In data recording, the radiative point 1a emits a beam to form the optical spot 13a with a recording power, and the radiative point 1b emits a beam to form the optical spot 13b with a reproduction power lower than the recording power. Further, an external magnetic field head 16 applies a magnetic field modulated by data information to a recording area. In this arrangement, servo signal information for so-called focusing and tracking is obtained from the optical spot 13a for erasing old information and for recording new information, and an information reproduction signal for verifying information recorded by the optical spot 13a is obtained from the optical spot 13b. This permits simultaneous achievement of erasing of old information, recording of new information, and reproduction for verifying the newly recorded information.

For normal data reproduction, the radiative points a, 1b both are activated to emit beams to form the optical spots 13a, 13b with a reproduction power lower than the recording power. In this case, the optical spot 13a is used for so-called focusing error detection and tracking error detection, while the optical spot 13b is used for normal reproduction of recorded information. Also, the preformat signal is obtained from the optical spot 13a in data recording but from the optical spot 13b in data reproduction.

As described, the magneto-optical disc apparatus of the present invention is so arranged that the first and second optical beams emitted from the two radiative points 1a, 1b in the semiconductor laser array 1 pass through substantially the same optical path to form the first optical spot 13a and the second optical spot 13b on the same information track on the magneto-optical disc 5, that reflected light from the magneto-optical disc 5 is guided to impinge onto the photo sensors 11, 12 to detect recorded information in the magneto-optical disc 5, that the first optical spot 13a is used for focusing error detection, tracking error detection, erasing of old information, and recording of new information, that the second optical spot 13b is used both for reproduction-while-recording of newly recorded information and for normal reproduction of recorded information, and that the first optical spot 13a advances and the second optical spot 13b follows on the moving information track.

Also, a plurality of receiving zones constitute a light receiving portion in the photo sensor 11, 12, optically corresponding to the first optical spot 13a, while a receiving zone constitutes a light receiving portion in the photo sensor 11, 12, optically corresponding to the second optical spot 13b.

The first optical spot 13a is also used for reproduction of a preformat signal in the information recording medium.

Describing outputs from the receiving zones in the photo sensors by the same reference symbols as those for the receiving zones, various signals can be obtained by the following calculations:

$$\text{focusing signal} = (a1 + d1) - (a2 + d2);$$
$$\text{tracking signal} = (b1 - c1) - (b2 - c2);$$
$$\text{verify-reproduction-while-recording } MO \text{ signal} = e1 - e2;$$
$$\text{normal reproduction } MO \text{ signal} = e1 - e2;$$

preformat signal =

$$(a1 + b1 + c1 + d1) + (a2 + b2 + c2 + d2);$$

and $$\text{preformat signal in normal reproduction} = e1 + e2.$$

This arrangement makes no difference in quality of a reproduced signal between reproduced signals in data recording and in data reproduction, and an increase in noise caused by the preamps is also less, thus providing an excellent S/N and improving the performance of verification.

The above embodiment of the present invention will be next compared regarding S/N with the conventional example, using specific numerical values and taking the photo sensor 11 in normal reproduction as an example.

Suppose the characteristics of a beam split film are arranged with reflectivity of s-polarized light (Rs) being 1 and reflectivity of p-polarized light (Rp) being 0.3, the reproduction power (Pr) is 1.2 mW, reflectivity of the magneto-optical disc (Rd) is 0.15, and attenuation by interposed optical elements (β) is 0.2. Also, assume that the Kerr rotation angle (Θ) is 1°, the mark length is about the size of the wavelength, and the period of marks is double that of the mark length. Further, let the signal frequency band (Bw) be 10 MHz and a photoelectric conversion efficiency of each photo sensor (γ) be 0.5 A/W. In this case, a DC component in output current (Idc) from each photo sensor is approximately given by the following formula.

$$Idc = Pr \cdot Rd \cdot Rp \cdot \{(1 - \beta)/2\} \cdot 0.5$$
$$= 1.1 \times 10^{-5} [A]$$

Normally, with a numerical aperture of qn objective lens being about 0.55 and defining 1 as a magneto-optical signal component obtained with the mark length larger than the optical spot 13a and the optical spot 13b, a magneto-optical signal component with the mark length nearly equal to the wavelength is about ⅓. Then, the magneto-optical signal component with mark length nearly equal to the wavelength (Iac) is approximated as follows:

$$Iac = (1/3) \cdot Pr \cdot 4 \cdot Rd \cdot \sin\Theta \cdot \sqrt{(Rp \cdot Rs)} \cdot \{(1-\beta)/2\} \cdot 0.5$$

$$= 4.6 \times 10^{-7} [A]$$

The signal components are thus calculated.

The noise is next discussed. The noise can be roughly classified under shot noise (Ns) and amp noise (Na). The amp noise is normally in the range of about 2 to 3 [pA/$\sqrt{Hz}$] for each preamp. Thus, it is assumed as 2.5. Let q be a charge of an electron. Then the shot noise can be approximated as follows both for the conventional example and the embodiment of the present invention:

$$Ns = \sqrt{2} \cdot q \cdot Idc [A/\sqrt{Hz}].$$

Since four preamps are used in the conventional example, the amp noise is regarded as a random noise to conduct a root-mean-square calculation and to result in a value twice the case of one preamp as follows.

$$Na = 2.5 \times 10^{-12} [A/\sqrt{Hz}]$$

The amp noise is as follows for the embodiment of the present invention.

$$Na = 2 \cdot (2.5 \times 10^{-12})[A/\sqrt{Hz}]$$

Accordingly, the noise component (In) is calculated by the following formula:

$$In = 2\sqrt{2} \cdot \sqrt{\{(Ns^2 + Na^2) \cdot Bw\}} \quad [Ap-p].$$

Thus, the noise component (In) is $4.8 \times 10^{-8}$ [Ap-p] for the conventional example, while $2.8 \times 10^{-8}$ [Ap-p] for the embodiment of the present invention.

Since S/N is defined as S/N=20·log (Iac/In), S/N is 19.6 [dB] for the conventional example, while 24.3 [dB] for the embodiment of the present invention. Thus, there is a difference of more than 4 dB. This difference is a great performance difference with respect to reliability of reproduced information and assurance of reliability of reproduced information with time. Especially, the difference becomes influential on the effectiveness of the apparatus when the signal level is lowered or the signal band is widened with an increase in recording density of information and an increase in transfer rate from the above formulas.

As detailed above, the present invention is excellent in performance of verification and can provide satisfactory S/N even if the signal level is lowered or the signal frequency band is widened with an increase in recording density of information and an increase in transfer rate. Also, the present invention can provide a cheap and compact optical information recording and/or reproducing apparatus which can perform simultaneous erasing/recording/reproducing.

What is claimed is:

1. An optical information recording and/or reproducing apparatus comprising:

first light spot forming means for forming a first optical spot on an information recording medium, for performing focusing error detection, tracking error detection, erasing of old information and recording of new information; and second light spot forming means for forming a second optical spot on the information recording medium, for performing reproduction of newly recorded information and for normal reproduction of recorded information.

2. An apparatus according to claim 1, wherein said first light spot forming means and said second light spot forming means respectively form the first optical spot and the second optical spot on the same information track on the information recording medium.

3. An apparatus according to claim 2, wherein said first light spot forming means and said second light spot forming means cause the first optical spot to advance and the second optical spot to follow on the information track.

4. An apparatus according to claim 1, wherein the first optical spot is further used for reproduction of a preformat signal in the information recording medium.

5. An optical information recording and/or reproducing method for use with an optical information recording and/or reproducing apparatus, said method comprising:

forming a first optical spot on an information recording medium, for performing focusing error detection, tracking error detection, erasing of old information and recording of new information; and forming a second optical spot on the information recording medium, for performing reproduction of newly recorded information and for normal reproduction of recorded information.

6. A method according to claim 5, further comprising forming the first optical spot and the second optical spot on the same information track on the information recording medium.

7. A method according to claim 6, further comprising causing the first optical spot to advance and the second optical spot to follow on the information track.

8. A method according to claim 5, further comprising using the first optical spot for reproduction of a preformat signal in the information recording medium.

9. An optical information recording and/or reproducing apparatus comprising:

light source means comprising a first light emission portion for emitting a first light beam and a second light emission portion for emitting a second light beam, the first and second light emission portions being provided on the same substrate;

first light spot forming means for forming a first optical spot on an information recording medium from the first light beam emitted from said first light emission portion, for performing focusing error detection, tracking error detection, erasing of old information and recording of new information; and second light spot forming means for forming a second optical spot on the information recording medium from the second light beam emitted from said second light emission portion, for performing reproduction of newly recorded information and for normal reproduction of recorded information.

10. An apparatus according to claim 9, wherein said first spot forming means and said second spot forming means respectively form the first optical spot and the second optical spot on the same information track on the information recording medium.

11. An apparatus according to claim 10, wherein said first spot forming means and said second spot forming means cause the first optical spot to advance and the second optical spot to follow on the information track.

12. An apparatus according to claim 9, wherein the first optical spot is further used for reproduction of a preformat signal in the information recording medium.

* * * * *

UNITED STATES PATENT AND TRADEMARK OFFICE
CERTIFICATE OF CORRECTION

PATENT NO. : 5,557,601
DATED : September 17, 1996
INVENTOR(S) : KOICHIRO NISHIKAWA It is certified that error appears in the above-indentified patent and that said Letters Patent is hereby corrected as shown below:

COLUMN 3:

Line 49, "whereas" should read --compared to--.

COLUMN 5:

Line 9, "and" should read --and are--;
Line 52, "a, 1b" should read --1a, 1b--.

COLUMN 6:

Line 28, "signal=" should read --signal in recording=--;
Line 61, "qn" should read --an--.

UNITED STATES PATENT AND TRADEMARK OFFICE
CERTIFICATE OF CORRECTION

PATENT NO. : 5,557,601
DATED : September 17, 1996
INVENTOR(S) : KOICHIRO NISHIKAWA It is certified that error appears in the above-indentified patent and that said Letters Patent is hereby corrected as shown below:

COLUMN 7:

Line 12, "$\overline{Hz]}$" should read --$\sqrt{Hz]}$--.

Signed and Sealed this

Eleventh Day of March, 1997

*Attest:*

BRUCE LEHMAN

*Attesting Officer*     *Commissioner of Patents and Trademarks*